United States Patent
Mozley et al.

[11] 3,714,429
[45] Jan. 30, 1973

[54] TOMOGRAPHIC RADIOISOTOPIC IMAGING WITH A SCINTILLATION CAMERA

[75] Inventors: John G. McAfee, The Carriage House East, Seneca Turnpike, Manluis, N.Y. 13104; James M. Mozley, 126 Windcrest Drive, Camillus, N.Y. 13031; Edward P. Stabler, 206 Crestwood Drive, Syracuse, N.Y. 13212

[22] Filed: Sept. 28, 1970

[21] Appl. No.: 75,827

[52] U.S. Cl. .............................. 250/61.5, 250/71.5 S
[51] Int. Cl. ........................... G01n 23/00, G01t 1/20
[58] Field of Search ......................... 250/71.5 S, 61.5

[56] References Cited

UNITED STATES PATENTS

| | | | |
|---|---|---|---|
| 3,509,341 | 4/1970 | Hindel et al. | 250/71.5 S |
| 3,011,057 | 11/1961 | Anger | 250/71.5 S |

OTHER PUBLICATIONS

Tomographic Techniques in Radioisotope Imaging, The Tomoscanner, by Miraldi et al., from Radiology, March 1970, pgs. 513–520.

*Primary Examiner*—Archie R. Borchelt
*Attorney*—Robert S. Dunham, P. E. Henninger, Lester W. Clark, Gerald W. Griffin, Thomas F. Moran, Howard J. Churchill, R. Bradlee Boal, Christopher C. Dunham, Robert Scobey, Henry T. Burke and Thomas P. Dowd

[57] ABSTRACT

A method and means for tomographic imaging involving the use of a radioisotopic detector comprising a scintillation camera with a multichannel parallel-hole collimator, whose holes are all inclined at an identical angle toward the field of interest, and the moving of this detector in a series of back-and-forth linear motions, centered on a common axis of rotation and with the collimator in reversed orientations, in such manner that the accumulated count rate information can be computed, stored, retrieved and selectively integrated to produce a tomographic image of the radioactive distribution in any selected plane in the field scanned. The count rate information is collected and computed in terms of a fixed coordinate system and provides a reservoir of computed data which may be analyzed, utilizing a time-lapse summation technique, to present any particular tomographic plane for imaging.

14 Claims, 14 Drawing Figures

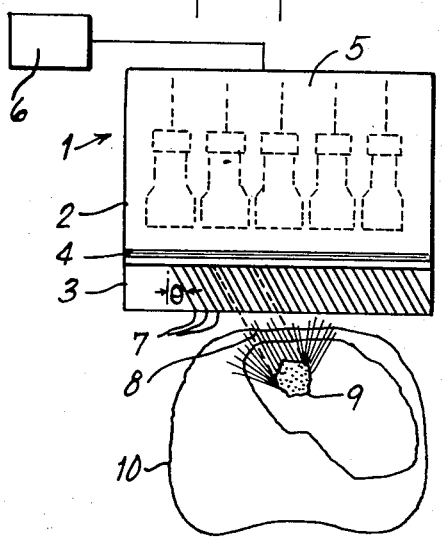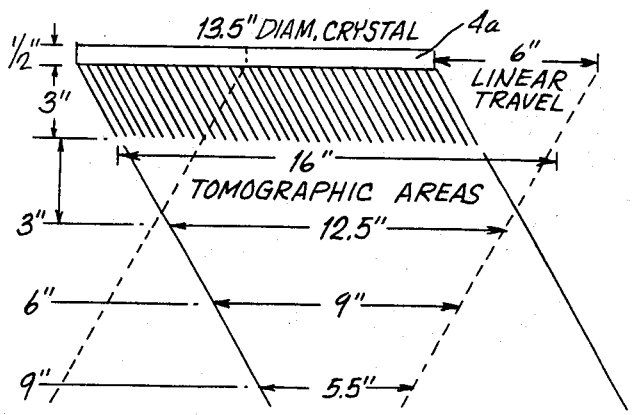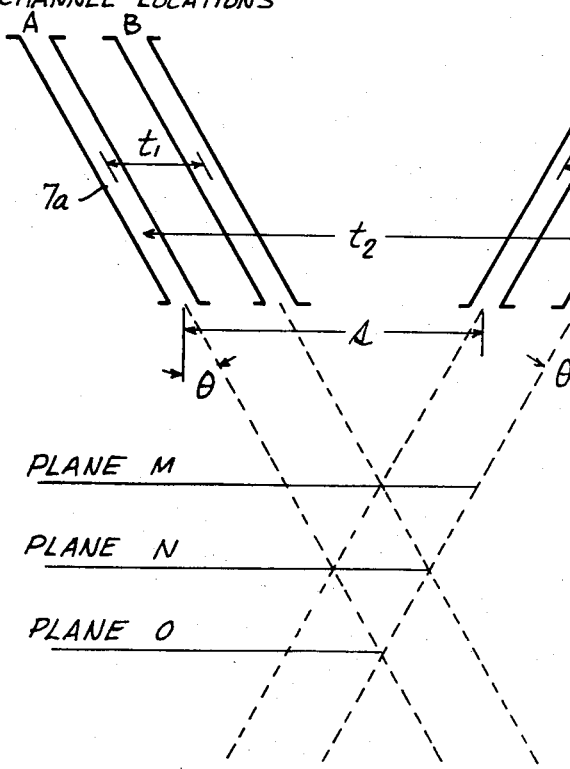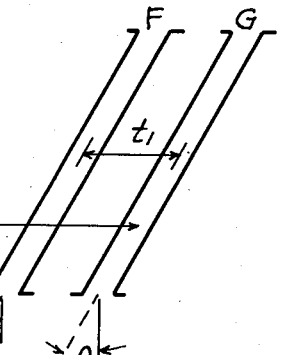

INVENTORS
JOHN G. McAFEE
JAMES M. MOZLEY
EDWARD P. STABLER
BY
Thomas F. Moran
ATTORNEY

INVENTORS
JOHN G. MCAFEE
JAMES M. MOZLEY
BY EDWARD P. STABLER

ATTORNEY

TOMOGRAPHIC RADIOISOTOPIC IMAGING WITH A SCINTILLATION CAMERA

BACKGROUND OF THE INVENTION

The present invention relates to the field of radioisotopic tomography and more particularly to a scanning technique and system for collecting and computing count rate information from a field of interest and presenting tomographic images of any selected plane in the field scanned.

Ordinary radioisotopic imaging devices used in medical diagnostic applications, produce images which are two-dimensional and which represent the sum of source distributions over a wide range of depths in the body of the patient being viewed. In contrast, tomographic imaging devices produce two-dimensional images which represent the source distributions in a relatively thin plane or layer of the body. The fundamental aim in improving all radioisotopic tomographic imaging is to make the device much more sensitive to radioactivity in the selected plane to be imaged, or alternatively or concomitantly cause it to ignore or to render non-image-forming the radioactivity from sources elsewhere.

The earliest use of tomography in radioisotopic imaging for medical purposes employed two techniques: longitudinal section scanning and transverse section scanning.

In longitudinal section scanning, the planes imaged were parallel to the long axis of the patient's body and the method consisted of making several scans of the body region of interest with a focussed collimator scanner inclined at a different angle for each scan. The tomographic image was originally obtained by superimposition and trans-illumination of the scanned films, but, more recently, digital computer storage processing and oscilloscope display techniques have been used. The method has not been extensively applied in the latter manner, since the system sensitivity was found to be rather low and requires long scanning times.

In transverse section scanning, cross-section tomograms perpendicular to the long axis of the patient's body are obtained and the method consists of making many tangential scans of the body at the desired section with a pair of opposed focussed collimator detectors. Each section is made at a slightly different angle. For example, a series of 24 passes may be made at angular intervals of 7.5°. The image information is stored digitally during the section and later digitally processed and displayed as an oscilloscopic image, consisting of a matrix of 100 × 100 picture elements. Transverse section scanning has proved to be most effective in brain imaging, but major deficiencies of this method are its low sensitivity and the requirement that each tomographic plane must be scanned separately.

A number of improvements and modifications on these techniques have been developed, utilizing further scanning maneuvers and using a number of detection means and methods of moving the patient with respect thereto. A recent particularly important development in this field was that of a tomographic gamma-ray scanner by Hal O. Anger which marked the first successful production of longitudinal radioisotopic section images in a feasible time period and one also suitable for clinical applications. This instrument uses a scintillation camera with an 8-inch diameter crystal and a matrix of seven photomultiplier tubes, having associated x-y position circuitry similar to the stationary camera disclosed in Anger's U.S. Pat. No. 3,202,201. A focussing collimator is attached to the camera and a rectilinear scanning motion is used. The scanning method is based upon the fact that sources at different depths in the field of a focussed multichannel collimator produce light in different areas of the camera crystal as the scanning proceeds. The positions of the illuminated areas of the crystal are determined by the array of seven photomultiplier tubes and are displayed on a cathode ray tube. The light from the cathode ray tube is used to expose a photographic film which is being moved in synchronism with the detector probe and the optical camera readout permits simultaneous imaging of five preselected planes of depth for recording. For a given imaged plane, information from any other depth is blurred and diminished in intensity.

The improved scanning method and means of the present invention possesses a higher efficiency of detection than the Anger scanner and includes the capability of accumulating the necessary information required for image formation within a relatively short time. In addition, the image planes of interest need not be preselected and fixed as with the Anger scanner and other prior art techniques, nor limited to planes parallel to the detector face so that both longitudinal and transverse section scanning can be accomplished. The information obtained may be digitally processed when the camera is taken off-line for the formation of a tomographic image of any desired plane in the scanned field within a few minutes. Further, the number of passes may be freely selected to control the signal to noise ratio versus scan time.

SUMMARY OF THE INVENTION

The present invention involves the use of a radioisotopic detector comprising a scintillation camera with a multi-channel parallel-hole collimator, having each hole inclined at an identical angle toward the field of interest, and the moving of this detector in a series of back-and-forth linear motions, each with the collimator reoriented, in such manner that the accumulated count rate information can be stored, played back and selectively integrated to produce a tomographic summation in any selected plane of the field. The series of back-and-forth linear scans by the detector are centered on a common axis of rotation, so that during opposing linear motions with the collimator differently oriented a store of count rate information is collected from the volume scanned which can be analyzed after the scanning operation by a time-lapse summation technique to obtain an image of the radioactive distribution in any tomographic plane included in the scan.

A suitable system is disclosed for detecting the count rate information in terms of the x and y-coordinates of the moving detector face and converting this data into fixed laboratory coordinates, which information may be put in digital form through a computer and stored on magnetic tape. When it is desired to analyze the data, it is fed back through the computer utilizing a time-lapse summation to select the particular tomographic plane to be imaged and the integrated data is converted to analog form for display on an oscilloscope. The displayed data may be integrated further photographically to obtain a high-resolution tomographic image of the radioactivity distribution in the plane selected. Thus, with the method and means of the present invention, all the data necessary for a thorough analysis of the tomographic field being viewed is obtained during the scanning operation, the parameters of which are determined by the equipment being used rather than the subject being viewed. During or after the scanning, the collected data may be analyzed in various ways to produce different information about the tomographic field of view as desired.

BRIEF DESCRIPTION OF THE DRAWINGS

FIG. 1 is a diagrammatic representation of a detector unit in accordance with the present invention, being used in a medical diagnostic application;

FIG. 2 is a diagrammatic representation illustrating the operation of a single hole in a collimator during a scanning operation in accordance with the present invention;

FIG. 3 indicates the tomograph fields viewed at various depths beneath a collimator executing a scan in the manner of FIG. 2, and FIGS. 3a–3e show the sizes of the tomographic fields of FIG. 3 at the upper surface of the collimator, the lower surface of the collimator and at depths of 3, 6 and 9 inches, respectively;

FIG. 8 illustrates the form of the counting rate information obtained during the scan of FIG. 7.

DETAILED DESCRIPTION

Figure 4:
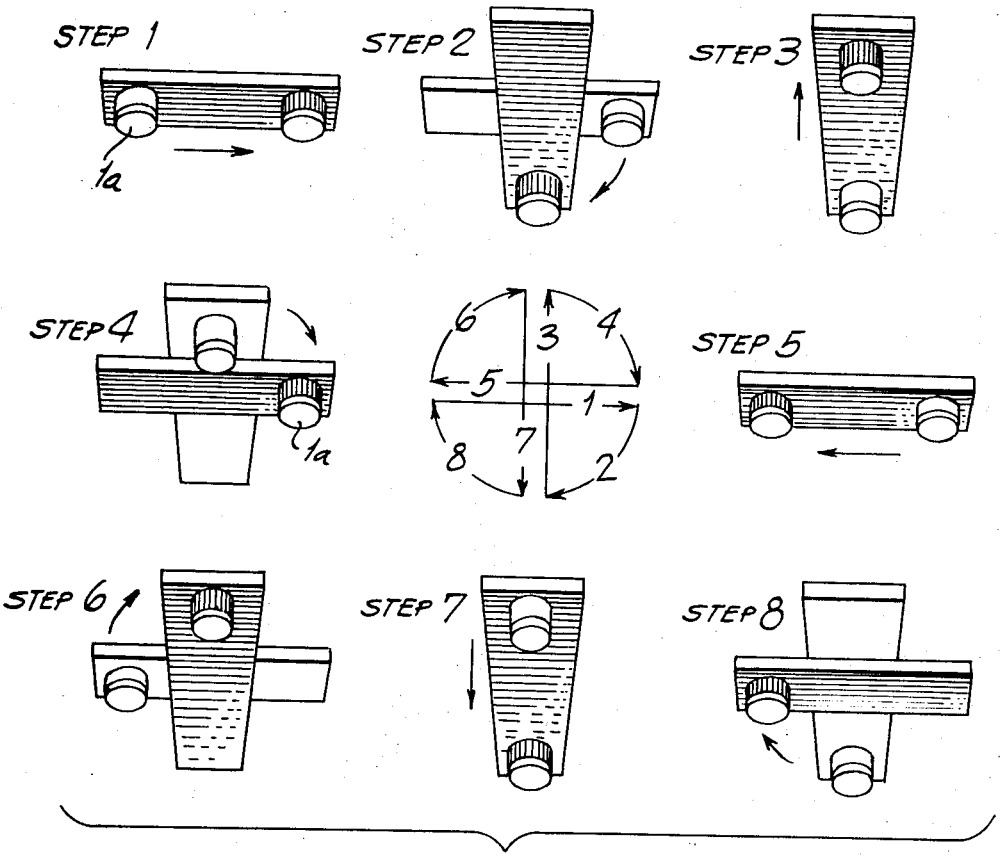
FIG. 4 is a diagram of the path of scanning motion of a detector unit for four linear passes, combining linear motion with rotation at the end of each scan line.

FIG. 1 shows a basic detector unit 1 which may be used in accordance with the present invention for imaging or locating a source of radiation in a subject such as a patient undergoing a diagnostic examination. The detector unit 1 is in the form of a scintillation camera 2, having a multichannel collimator 3 mounted on its face. The camera 2 comprises a scintillation crystal 4 which is struck by radiation passed by the collimator 3, and an electronics section 5 for detecting scintillations produced by the radiation striking the crystal 4 and for providing an indication of their position with respect to an $x$, $y$-coordinate axis established on the crystal's surface. The electronics section 5 feeds the scintillation counting rate information to a data storage or utilization means 6. For the purposes of our description, the camera used will be similar to that of the previously cited Anger scanner, but it will be understood that various other scintillation cameras may be found suitable in this application.

The collimator 3 is a multi-channel collimator having parallel holes 7, each of which is inclined at an identical angle $\theta$ with respect to the crystal's surface. It will be seen in FIG. 1 that radiation 8 emanating from a radioisotopic source 9 within a patient 10 or other subject will only be passed by the collimator 3 if directed in accordance with this angle $\theta$. The radiation 8 will strike the surface of the crystal 4 at some point on the $x$, $y$-coordinate axis of the crystal face and the resulting scintillation will be counted in accordance with its coordinate position. The resulting count will thus indicate a source of radiation lying at some indeterminate distance along a line passing through the point of the scintillation and parallel to the collimator holes 7. If the detector unit 1 is moved to the right in FIG. 1, the position of the scintillations resulting from radiation 8 from the radioactive source 9 will move to the left on the surface of the crystal 4. Now, by combining this forward linear motion with a backward linear motion after the collimator has been rotated through 180°, the distance of the radioactive source 9 from the surface of the crystal 4 may be determined as will be explained, using a technique in accordance with the present invention.

For a clear understanding of this technique, consider a single inclined hole in the collimator 3 and the effects which occur during its back-and-forth linear motion as indicated above. Referring to FIG. 2, such a single inclined hole or channel 7a, is shown diagrammatically at two different times during the forward motion of the collimator 3 at locations A and B, and during the return linear motion of the collimator after rotation through 180° at some other locations, F and G. The time interval and distance between A and B will be the same as that between F and G. The angle of inclination $\theta$ of the channel 7a during the return motion will, of course, be equal, but opposite in direction to that of the forward motion. Using the detector unit 1 described in FIG. 1, the counting rate information from the scintillation camera 2 at the $x$, $y$-coordinate location of the channel 7a at various times, may be recorded and stored on a suitable medium, such as digital magnetic tape, and later selectively played back as desired. Then, if the counts at locations A and F, and B and G, for example, are appropriately summed, the radioactivity distribution at plane N may be accentuated. Similarly, by summing the counting rates at locations B and F, a more superficial plane, M, is accentuated and by combining the rates at the A and G locations, a deeper plane, O, is accentuated.

While radiation from a source lying in any plane along the line from a given location will be counted at that location, that is, any source lying along the line from A such as in planes M, N or O, will cause a count at A, the summing of the counts from a number of passes in different directions will statistically accentuate the counts from a source lying in a plane selected in the above manner. The counts from a source lying in the selected plane will provide a reinforced image of that source, while the counts from sources in other planes will be distributed so as to blur their images. Thus, by selectively integrating the counting rate signals, a tomographic summation of the radioactive distribution at any selected depth can be obtained.

The depth of any accentuated plane, such as plane N, can be determined by multiplying the co-tangent of the angle of inclination θ of the channel 7a from the vertical, by half the distance s separating the centers of the channel locations (A,F) at zero depth. Therefore, if the channel angle θ is 30°, to accentuate depths at 2 cm. intervals, separation distances of 3.46 cm. would be used. Increasing the angle θ would increase the tomographic effect or decrease the thickness of the accentuated layer, but at the same time, the resolution in the direction of the linear motion would be degraded due to parallax.

An appreciation of the tomographic field which may be viewed with this technique, can be gained from FIG. 3, which shows a 13.5 inch diameter crystal 4a, of ½ inch thickness, that is moved through 6 inches of linear travel in the back-and-forth directions The collimator depth or thickness is 3 inches. FIGS. 3a–e define the sizes of the tomographic fields which may be accentuated under the stated conditions at different locations, that is, respectively at the surface of the crystal (13.5 inches), the surface of the collimator, (13.5 inches) and at depths of 3, 6 and 9 inches (12.5, 9.0 and 5.5 inches).

It will be appreciated that better accuracy and definition in imaging may be obtained by performing the rectilinear scanning motion in multiple planes having a common central axis of rotation. A diagram of the path of motion of a detector unit 1a combining linear motion with rotation at the end of each scan line is shown in FIG. 4 for the simple case of two intersections at 90° from one another for four linear passes. The position of the detector head 1a at the beginning of each motion is indicated by the light figure and the position at the end of the motion is indicated by the dark figure. The total motion sequence amounts to four linear and four rotational motions. Using the same types of motion, intersections of six or eight pairs of scan lines may be carried out to decrease the probability of false indications and to overcome signal to noise ratio problems when the counting rates are compared during subsequent analysis. The preferred technique is shown wherein the camera and collimator are moved as a unit, but the same scanning operation may be accomplished by appropriately translating the camera at right angles and rotating the collimator on the camera face. Of course, the camera may be held stationary and the subject which embodies the field of view can be moved if desired.

It will also be seen that the present technique would be inefficient for a small diameter detector moving over a relatively long linear scanning area, since the central area in which the full tomographic effect would be produced can be no greater than the diameter of the detector. However, using a large area, 13.5 inch diameter detector and a relatively short linear motion, the central area of full tomographic effect obtainable with the present invention represents a major fraction of the total area scanned. Essentially this area comprises a solid cone whose axis is the common axis of rotation of the detector unit during scanning and whose base is the size of the detector face. The count rate information obtained from this conical volume provides a store of data from which tomographic images of any area or plane, vertical, horizontal or oblique, may be drawn.

Figure 5:
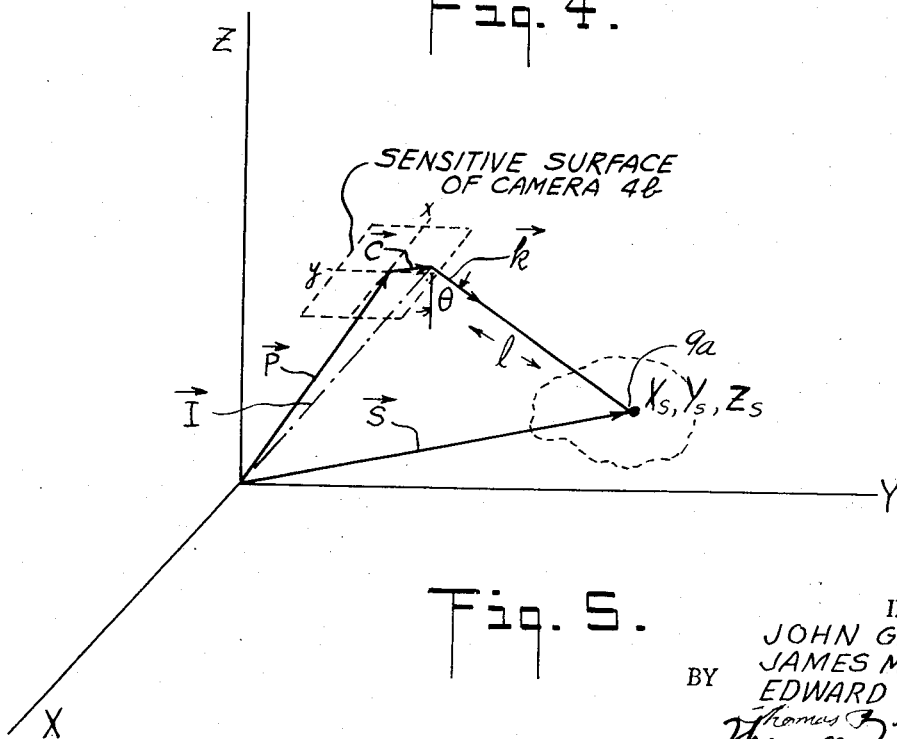
FIG. 5 is a vector diagram illustrating the manner of locating a radiation source with respect to laboratory coordinates in the manner of the present invention.

Now, considering more particularly the actual collection and processing of data with the given system, it will be appreciated that the original source of data, which is the scintillation camera 2, provides only the incidence of and the x, y-coordinates of scintillations occurring on the surface of the crystal 4 due to the impinging of radiation from radioisotopic sources lying in the scanned field. Since the camera 2 will be in motion during the scanning operation, to facilitate analysis it is desirable to establish a fixed frame of reference with respect to which the positions of the radiation sources may be determined. Hence, a fixed laboratory coordinate system is established and the coordinates registered by the camera 2 are corrected to obtain the true coordinates of the scintillation event relative to the fixed coordinate system. To ultimately determine the location of a source of radiation in the field with respect to this coordinate system, the basic data points which must be collected for each event, therefore, consist of the x, y-coordinate of the event on the face of the crystal, the position of the crystal in the laboratory coordinate system, and since the collimator establishes a direction in space from which the radiation is collected, which direction is periodically changed during the total scanning operation, the direction of the collimator at the time of the event must be recorded. This information is shown in the form of a vector diagram in FIG. 5, wherein the camera location relative to the laboratory coordinate system, X, Y, Z, is represented by the vector P; C is a two-dimensional vector which represents the x, y-coordinate information on the face 4b of the crystal, the height of the camera 2 being fixed in the Z-direction during scanning; and k is a unit vector representing the angle of the collimator holes with respect to the crystal face. The ultimate vector to be determined is the vector S which locates the source of radiation 9a with respect to the laboratory coordinate system. The value of the vector S may be obtained from the following relationship:

$$S = \bar{P} + \bar{C} + \bar{k}l$$

where 1 is a scalar quantity representing the distance between the crystal surface 4b and the source of radiation 9a along the direction established by the collimator unit vector k.

It will be appreciated that with the system described, when a scintillation occurs on the surface of the crystal, appropriate data may be readily recorded indicating the location of the camera $\bar{P}$, the location of the scintillation on the crystal surface $\bar{C}$, and the orientation of the collimator $\bar{k}$. However, this information is insufficient to determine the position $X_s, Y_s, Z_s$ of the radiation source 9a with respect to the laboratory coordinates, since the distance from the crystal to the source of radiation 1 is not known. Accordingly, during the scanning operation, the values of $\bar{P}, \bar{C}$ and $\bar{k}$ may be continuously recorded for each event and stored for further analysis.

The quantity $\bar{P}$ is a function of time, since the camera is in motion during a scan, so that its position may be recorded along with and in reference to a signal from a real time clock. The vector k is also a function of time, but it remains fixed during each scan so that its value need only be recorded once at the start of each pass. The value of a corrected data point may be computed from $\bar{P}$ and $\bar{C}$ to obtain a vector quantity I indicating the true location of the scintillation event in the fixed coordinate system and which may be the form of the actual signal stored for further analysis.

The stored data may then be analyzed by feeding the information regarding the corrected data points to a suitable computing means which may be adapted to combine this information with various values of l and perform the vector calculation to provide respective values of $\bar{S}$. In this manner, a continuum of planes may be accentuated of any orientation, subject to the resolving powers of the detector apparatus, by varying the value of l in the computations. As will be seen upon considering FIG. 2 in conjunction with the similar but more detailed FIG. 9, a particular value of l may be chosen by selecting an appropriate time lapse between the counts provided by a single channel during different passes in the scanning operation.

Figure 9:
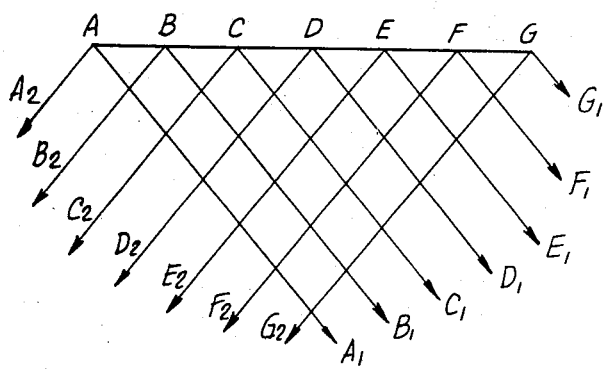
FIG. 9 is a diagrammatic representation similar to FIG. 2 illustrating the field scanned by a single hole in a collimator during back-and-forth linear motion.

For example, the successive $k$ vectors during the first pass are represented in FIG. 9 by the vectors $A_1$ to $G_1$, while those of the reverse pass are represented by the vectors $A_2$ to $G_2$. Now if it is desired for instance, to accentuate the counts lying in a line in a vertical plane passing through the point D, counts recorded during the forward pass $A_1$ to $G_1$ are summed with those of the reverse pass, that is, $A_1$ with $G_2$, $B_1$ with $F_2$, etc. It will be seen that summing may be stopped when the opposite $k$ vectors taken at a coincident point are reached in the series, in this case at point D. It will be seen, further, upon considering FIG. 9 that the line to be accentuated may be chosen by selecting the point in the counts of the second pass at which the summation with the counts of the first pass is begun. Thus, if the time taken in the second pass to go from the point G to the point E is allowed to elapse before the summing of the two passes is begun, a line lying in the vertical plane passing through the point C will be accentuated. The delay in counting effectively varies the valve of l so that l can be determined in terms of the time lapse. This relationship may be more clearly understood by considering the accentuation of lines lying in horizontal planes The latter accentuation can be achieved by summing the counts in the second pass in reverse order with the counts of the first pass. It will be seen in FIG. 9 that as the elapsed time before summing is increased, the horizontal plane which is imaged is deeper within the scanned field. Hence, if the summing of the counts is begun with the $B_2$ vector, a shallow plane will be accentuated, while if they are begun with the $E_2$ vector, a much deeper plane will be accentuated. As the time lapse is increased then, the value of the scalar l is directly increased. It will also be seen that by selecting a count for a given vector, for example, $B_1$ in one pass and summing it with the counts in the other pass appropriately, an oblique plane can be imaged.

The computing means may then accomplish, by a time lapse summation, the accentuation of the radioactive distribution in any plane located in the scanned field below the surface of the crystal. In this manner, the location of a radioactive source in the field may be precisely located and complete tomographic imaging of the radioactivity distribution in the total field may be obtained by suitable summing of the count rate information collected by each of the collimator holes during the entire scan.

Figure 6:
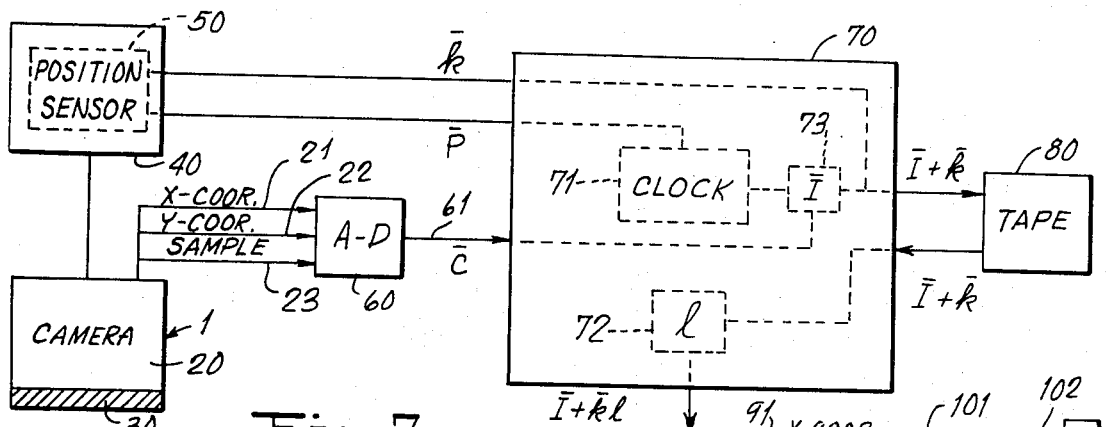
FIG. 6 is a block diagram of a system for producing a tomographic image in accordance with the present invention.

A suitable system for use in performing the above described technique is shown in block diagram form in FIG. 6. The system broadly comprises the detector unit 1, including a camera 20 and collimator 30; a motion mechanism 40 for moving the camera 20 during the scanning procedure and having an associated position sensor 50; an analog to digital converter and logic 60 for receiving the analog count signals from the detector unit 1 and feeding corresponding digital signals to a digital computer; a digital computer 70 for receiving the digital count signals representing C vector data and also receiving signals from the camera position sensor 50 representing the P and $k$ vector data; a real-time clock 71 associated with the computer 70 for referencing the position signals; a tape storage device 80 for receiving and storing information from the computer 70 and returning it thereto for analysis; a time-lapse setting means 72 in the computer 70 for selecting the tomographic information to be summed; a digital-to-analog converter and logic 90 for receiving the digital summed information and feediing it in analog form to a display means; and a display system 100 comprising a cathode ray tube display device 101 in combination with a photographic camera unit 102 for producing the tomographic image of a selected plane.

Figure 7:
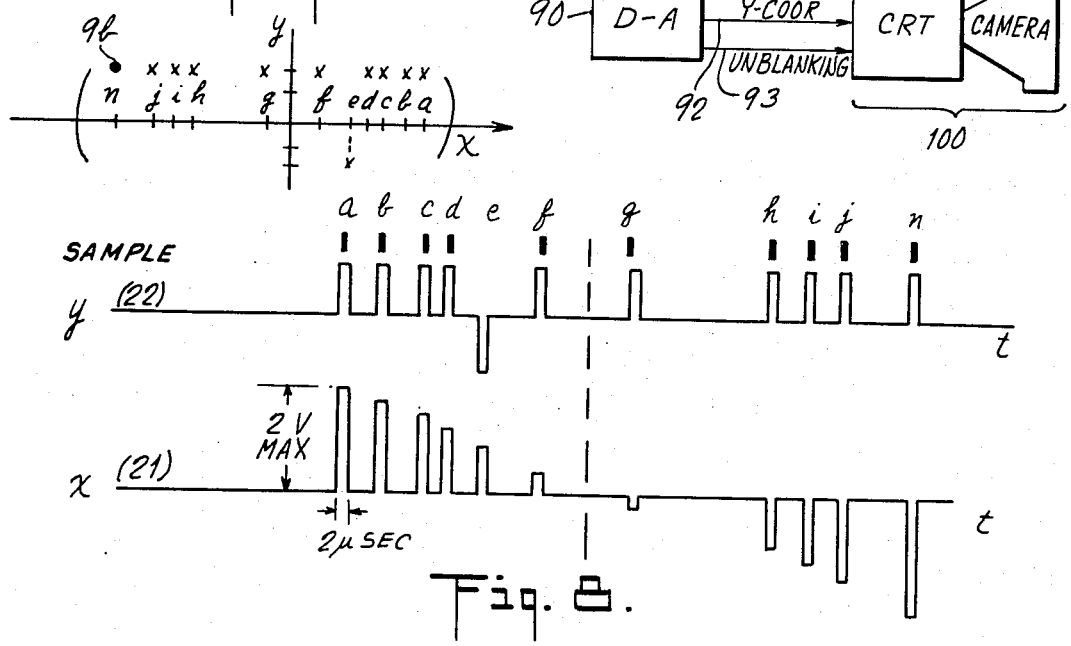
FIG. 7 is a diagrammatic representation viewed from the top of the detector unit during a linear scan of a radioactive point source.

More specifically, the detector unit may be a previously identified Anger camera model PHO/GAMMA III, manufactured by Nuclear Chicago of Des Plaines, Ill., which will produce counting pulses of approximately four microseconds duration. As the pulses due to scintillation events will occur at an average rate of about 3kHz and a peak rate of not more than 10 kHz all the events should be counted. Each event will produce an x-coordinate signal and a y-coordinate signal on lines 21 and 22, respectively, the coordinate values being proportional to the pulse height and polarity. More particularly, the pulse height or amplitude is a function of the displacement off the center axis, or zero point, of the crystal coordinate system and the polarity indicates the quadrant. For example, a point source $9b$, lying at a position of $y=+2$ in the field of a camera moving along the x-axis, as shown in FIG. 7, will produce output counts in the $x$ and $y$ output channels (21,22) of the form shown in FIG. 8, the letters of the counts corresponding to the positions of the scintillations.

These count signals provide analog information which is converted by the converter and logic 60 to digital form for feeding to the computer 70. Means is also provided for producing a sample signal on line 23 in the form of a gating pulse indicating that the x and y-coordinate data should be stored. The gating pulse will be produced only when the energy of the impinging radiation falls within a preselected energy window, that is, an acceptable range, so that scintillations due to scattering and background will not be stored. It will be noted that the spurious count at e in FIGS. 7 and 8 will not be stored as there is no coincident gating pulse.

The signals on line 61 between the analog-to-digital converter 60 and the computer 70 are 18-bit digital signals, with 8 bits representing each of the digitized $x$ and y-coordinate or C vector information. This converter 60 may be the commercially obtainable Model ADC-H manufactured by Datel, Inc. of Canton, Mass., and the logic section may be constructed from conventional, commercially available logic modules, such as those obtainable from Digital Equipment Corp. of Maynard Mass., as will be familiar to those skilled in the art.

The computer 70 may be a model PDP 15/20 computer manufactured by Digital Equipment Corporation, or any of a number of other small, fast, general purpose laboratory computers. The computer 70 will be programmed for computing the various vector valves as previously indicated, and the real-time clock 71 is used so that the program can continuously check the time with respect to the start of camera motion.

The position sensor 50 associated with camera motion mechanism 40 provides signals to the computer representing both the camera position, with respect to the laboratory coordinates and the collimator orientation, that is, the respective P and $k$ vector information. Since the camera velocity is constant, the time duration information provided by the real-time clock 71 can be converted directly to camera position information. The collimator orientation will be periodically changed, that is, to a different direction for each of the several passes made by the camera in normal operation and therefore the computer may keep track of the collimator orientation during each pass by monitoring the camera start and stop signals derived from the position sensor 50.

After the computer 70 has received appropriate P, C and $k$ vector information, the value of each data point may be corrected to the fixed coordinate system by summing the digital signals representing the P and C vectors in section 73. This summation provides the vector quantity I which may be stored in this summed form along with the $\bar{k}$ digital signal information in any suitable electronic means, such as on magnetic tape. The tape storage unit 80, for example, may be an IBM compatible, 9-track, 800-bit-per-inch, 75-inch-per-second tape transport and controller.

It should be noted that with this detection and computing system, all the appropriate data may be stored and held for analysis at some subsequent time when the camera has been taken off line after the scanning of the patient has been completed. When it is desired subsequently to analyze the stored data, the information is read off the tape back into the computer 70. The computer 70 may be programmed to permit time-lapse summation of the information obtained in the respective passes during the scanning operation. A tomographic image of a plane at a particular depth in the field may then be selected by choosing the appropriate time lapse corresponding to the scalar value 1 indicative, as previously explained, of the given depth. The time-lapse summation data for the given depth is then fed by the computer to a digital-to-analog converter 90. As all of the signals remain in digital form during storage, retrieval, and computation, it is necessary to convert the information into analog form for display on an output means, such as a cathode ray tube. The digital-to-analog converter and logic 90, may, like the converter and log 60, comprise conventional, commercially available logic modules along with a Datel, Inc. Model DAC-I converter, and will then generate an analog representation of the computed $x$ and $y$-coordinate information on lines 91 and 92, respectively, along with a beam unblanking pulse on line 93 which can be used to directly operate the oscilloscope 101.

An appropriate display system 100, comprising the cathode ray tube 101 and camera 102 in combination, may be the commercially available oscilloscope Model 7503 and camera unit, Model C51 manufactured by Tektronix Corp. of Beaverton, Ore. This Model 7503 system may be used to obtain the tomographic images or any of a number of other conventional display units would also be suitable for this purpose. However, the data rate from the digital-to-analog converter 90 is fairly high, so that in order to obtain a desired resolution of 256 lines or better on an oscilloscope display, the $x$, $y$-coordinate amplifiers in the display unit should have a band width of approximately 5 MHz.

A computed time lapse summation picture of the radioactivity distribution in the selected plane may thus be presented on the face of the cathode ray tube 101. In the computed picture, radiation actually originating from the selected plane which will be located a distance corresponding to the chosen 1 value below the camera, will be displayed in its true position, regardless of the value of the $k$ vector during the scanning. Radiation originating at a distance d from the selected plane will be displayed offset from its true position by an amount $\bar{k}d$. Since the value of $\bar{k}$ is altered with each pass over the field being viewed, radiation sources not in the selected plane will be displayed in a diffused, out-of-focus manner. In contrast, radiation from the selected plane is in focus and is reinforced during each pass. The photographic film viewing the data displayed on the surface of the cathode ray tube 101 will integrate the information from each pass and provide an intensified photograph of the radiation sources lying in the selected plane.

It will therefore be seen that a system and technique for gamma-ray tomography is presented which is also suitable for dynamic and whole body scans of a conventional nature and permits a high efficiency of detection and the forming of tomographic images in any desired plane. The system is capable of utilizing existing technology in accumulating the necessary counting rate information within a time of approximately 10 minutes and of digitally processing the information for providing a desired image within a few minutes. While a digital computation system has been disclosed, it is also feasible to produce tomographic images by analog tape recording and analog computer processing using the principles of the present invention but at the sacrifice of computational flexibility.

The present system also avoids many of the strictures of prior art devices by permitting the flexible selection of the number of scans which need to be used before scanning, depending upon the level of the signal of interest as compared with the level of ambient signals and the degree of image definition which is required. A further advantage is that offline computation is possible, permitting analysis of any subsequently selected plane since signals from every point in the spatial volume scanned have been stored. This improved selectivity provides the ability to detect small values of increased or decreased activity within a large volume of radioactivity.

While the method and means of the present invention have been described in connection with a medical diagnostic application, it will be appreciated that it need not be limited to such use, but may find many scientific and industrial applications, such as in materials testing and analysis and the like.

What is claimed is:

1. Apparatus for tomographic imaging comprising:

a. means for defining a sensing surface and for producing signals indicative of the location on said surface of impinging radiation originating in a particular field of interest;
b. means for causing relative movement between said surface and said field of interest in a scanning pattern comprising back-and-forth linear passes centered on a common axis of rotation coincident with the central axis of the field of interest;
c. multichannel parallel-hole collimator means interposed between said surface and said field for restricting said impinging radiation at a given instant to radiation from a volume within said field originating from a given direction inclined with said surface, which collimator means is reversely oriented during coincident linear passes; and
d. means for selectively summing the signals from different linear passes to produce a tomographic image of the radiation source distribution in any area lying in the field of interest.

2. Apparatus as in claim 1, comprising:
e. means for producing signals indicative of the position of said surface-defining means relative to the field of interest with respect to a fixed coordinate system during movement;
f. means for producing signals indicative of the orientation of said collimator means during each pass; and
g. means for recording all of said indicative signals produced during said scanning movement.

3. Apparatus as in claim 2 comprising:
h. means for supplying said recorded signals to said summing means; and
i. means for utilizing the summed signals for producing a display of said tomographic image.

4. Apparatus as in claim 3 wherein said summing means comprises an electronic computer.

5. Apparatus as in claim 4 wherein said computer comprises means for selectively summing any portions of the recorded location signals in different linear passes.

6. Apparatus as in claim 4 comprising means for storing said recorded signals.

7. Apparatus as in claim 6 wherein said storing means is magnetic tape.

8. Apparatus as in claim 1 wherein said sensing surface defining means is a scintillation camera.

9. Apparatus for tomographic imaging of the radiation source distribution in an area lying in a field of interest comprising:
a. a camera for sensing incidents of impinging radiation on the face thereof;
b. a multi-channel parallel-hole collimator on said camera, the holes of which are all inclined at an identical angle with the camera face;
c. means for causing relative movement between said camera face and said field of interest in a scanning pattern, comprising back-and-forth linear passes centered on a common axis of rotation coincident with the central axis of the field of interest;
d. means for oppositely orienting said collimator during coincident linear passes;
e. means for producing signals indicative of a vector quantity corresponding with the location of the impinging incidents with respect to a coordinate system on the camera face;
f. means for producing signals indicative of a vector quantity corresponding to the position of the camera face relative to the field of interest with respect to a fixed coordinate system during movement;
g. means for producing a signals indicative of a unit vector corresponding to the orientation of the collimator during each pass;
h. means for performing a vector summation to address the location of the incidents collected during scanning with respect to the fixed coordinate system and for recording the orientation of the collimator unit vector for the addressed incidents; and
i. means for controlling the magnitude of the collimator unit vector and selectively summing the incident signals from different linear passes to produce tomographic images by accentuating the radiation source distributions in selected areas in said field of interest.

10. A method of tomographic imaging utilizing a scintillation camera in combination with a multi-channel parallel-hole collimator whose holes are all inclined at an identical angle with the camera face, comprising the steps of:
a. relatively moving the camera and a field of interest in a series of back-and-forth linear passes centered on a common axis of rotation with the collimator being oppositely oriented during coincident linear passes;
b. recording the incidence and location of scintillations on the face of the camera during the scanning operation;
c. recording the location of the camera relative to the field of interest with respect to a fixed set of coordinates during the scanning operation;
d. recording the orientation of the collimator during each linear pass;
e. using the recorded information to compute the location of each scintillation with respect to the fixed coordinate system and the orientation of the collimator at the time of the scintillation; and
f. selectively summing the computed information from different linear passes to obtain a tomographic image of the radiation source distribution in a selected plane of the field of interest.

11. Method of tomographic imaging of the radiation source distribution in an area lying in a field of interest comprising the steps of:
a. detecting the radiation originating in the field of interest which impinges on a given area and noting the locations of the impingements in the area;
b. relatively moving the given area and the field of interest in a scanning pattern comprising back-and-forth linear passes centered on a common axis of rotation coincident with the central axis of the field of interest;
c. restricting the impinging radiation to radiation from a given direction at an angle to said given area during movement and reversing the angle during coincident linear passes; and
d. selectively summing the noted impingement locations of different linear passes to accentuate the radiation source distribution in any selected area in the field of interest providing a tomographic image.

12. Method as in claim 10 comprising the further steps of:
e. recording a vector quantity corresponding to the location of the impingements with respect to a coordinate system in the given area;
f. recording a vector quantity corresponding to the position of the given area relative to the field of interest with respect to a fixed coordinate system during movement;
g. recording a unit vector corresponding to the restrictive angle during each pass;
h. summing the recorded vector information to address the impingements collected during scanning with respect to the fixed coordinate system; and
i. controlling the magnitude of the unit vector during the selective summing.

13. Method as in claim 12 wherein the summing is performed in a digital computer.

14. Method as in claim 13 wherein the resulting tomographic image is displayed on an oscilloscope.

* * * * *